June 30, 1942.   S. M. GRISWOLD   2,288,448
MANUFACTURE OF INSOLES
Filed May 3, 1940
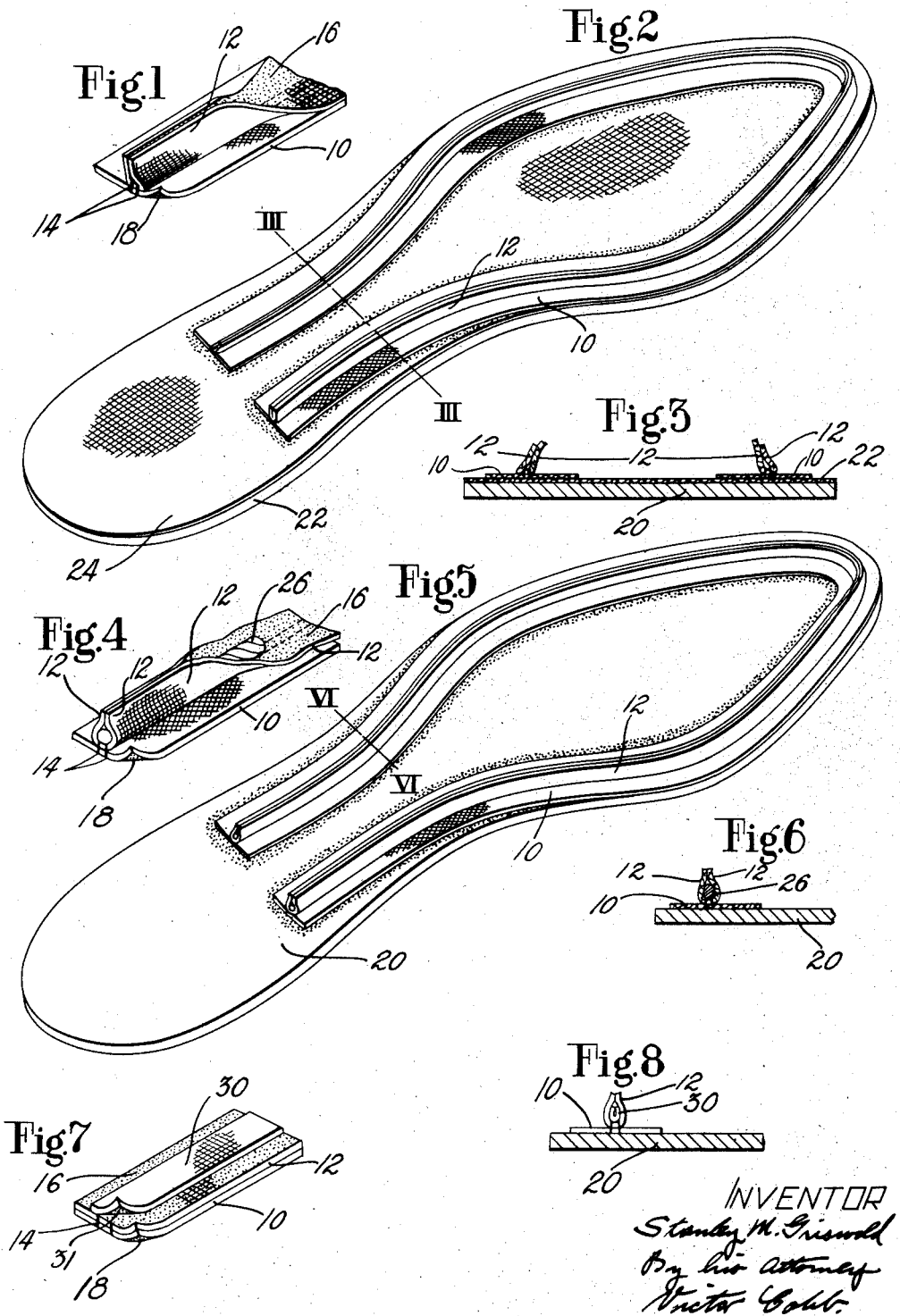

Patented June 30, 1942

2,288,448

UNITED STATES PATENT OFFICE 2,288,448

MANUFACTURE OF INSOLES

Stanley M. Griswold, Newton, Mass., assignor, by mesne assignments, to B. B. Chemical Co., Boston, Mass., a corporation of Massachusetts Application May 3, 1940, Serial No. 333,196

35 Claims. (Cl. 12—146)

This invention relates to insoles, to the art of making the same, to a composite strip for use in forming ribs or lips on insoles to adapt them for use in the manufacture of welted shoes, and to methods of making such strip.

Objects of this invention are to effect economies in the manufacture of insoles and to provide an improved insole having a substantial rib firmly attached by cement alone to the body of the insole.

The composite strip may comprise two layers of textile material of indefinite length directly connected together longitudinally and continuously of the strip intermediate the margins of the layers over a wide transverse portion approximately equal to the width of the base of an insole rib. The attachment of the two layers forming the composite strip is preferably effected by sewing two continuous, parallel lines of stitches through the layers, the lines of stitches being separated from each other by a short distance and securing together narrow, longitudinally extending areas between the edges of both strips. The widthwise extent of the connected areas should, of course, correspond substantially to the width of the between-substance of a usual welt insole. The layers forming the strip may be identical and may be either square cut or bias cut. Preferably one of the layers is square cut and the other bias cut, the bias cut layer being adapted for attachment flatwise to the marginal portion of the insole to form a base or support for the insole rib and the margins of the other or square-cut layer being adapted to be turned up and pressed against each other to form the insole rib. The two layers of the composite strip may therefore be referred to respectively as the base layer and the rib-forming layer.

If desired, the rib-forming layer may be stiffened by applying thereto a stiffening material, for example a solution of thermoplastic material, so that when this layer is formed into the rib a stronger and firmer rib will be produced. The insole body to which the composite strip is to be attached to form a sewing rib may be made of cheap and thin leather or other suitable material and when very flimsy material is utilized it is desirable to reinforce the insole body with a layer of cheap fiber such as duck, canvas, buckram or burlap. The fabric layer may be treated with a stiffening material and provides a smooth, even surface for the attachment of the composite strip thereto. The marginal portion of the fabric side of the insole body is coated with pressure-responsive cement and the cemented side of the base layer of the composite strip pressed against the insole to cause the strip to adhere, care being taken that the area of attachment over which the layers are held together (for example, the space between the stitches) shall occupy the position of the between-substance in a channeled insole. The marginal portions of the rib-forming layer may be turned up and pressed against each other to form a rib before the base layer is attached to the insole or after the base layer has been so attached, or the rib-forming operation may be performed in conjunction with the attachment of the base layer to the insole.

In case a thicker and firmer rib is desired, a core such as a cord or strip of material may be introduced between the marginal portions of the rib-forming layer, for example, in conjunction with the operation of turning these portions up and pressing them together. Preferably the dimensions of the core will be such that the marginal portions of the rib-forming layer beyond the core can be brought together and pressed against each other completely to enclose the core in the rib-forming layer.

In order to produce a thicker and firmer rib without the use of a core, a strip of fabric or equivalent material which may be considerably narrower than the rib-forming layer is applied to the central portion thereof. This three-layer composite strip is applied to the insole in the same manner as the two-layer strip and the marginal portions of the rib-forming layer are turned up toward each other, the reinforcing strip by that action being folded upon itself and forming a two-layer reinforcement for the rib formed by the rib-forming layer.

These and other features and aspects of the invention will appear more fully from the following detailed description when read in connection with the accompanying drawing and will be pointed out in the appended claims.

In the drawing,

Fig. 1 is a perspective view of the composite rib-forming strip the upper layer of which is in process of being formed into a sewing rib;

Fig. 2 is a perspective view of an insole to which the composite strip of Fig. 1 has been applied, the marginal portions of the upper or rib-forming layer having been turned up and pressed against each other to form a sewing rib;

Fig. 3 is a sectional view along the line III—III of Fig. 2;

Fig. 4 is a perspective view of a portion of the composite strip the upper layer of which is in process of being formed about a core;

Fig. 5 is a perspective view of an insole to which a composite strip formed as illustrated in Fig. 4 has been attached;

Fig. 6 is a sectional view taken along the line VI—VI of Fig. 5;

Fig. 7 is a perspective view of a composite strip similar to Fig. 1 to which a narrow reinforcing strip has been applied; and Fig. 8 is an end view of the composite strip after the rib-forming layer and reinforcing strip have been formed into a sewing rib and applied to an insole shown in section.

The composite rib-forming strip of the present invention may be made, as illustrated in Fig. 1, by providing two strips of textile material such as Gem duck, one to form the base layer 10 and the other to form the rib layer 12. The layers 10 and 12 are attached to each other along narrow longitudinal areas between their edges by stitching, for example by two continuous, parallel lines of stitching 14 which are spaced a short distance from each other, such distance corresponding approximately to the width of the between-substance in a usual channeled insole. In practice, unless a core is used, this distance will be about one sixteenth of an inch and may be about one eighth of an inch when a core is used. Preferably and as shown, the base layer 10 is a bias-cut tape and the layer 12 a square-cut tape. Since the base is bias cut, it conforms more readily to the contour of the insole which it must follow when applied thereto. If the rib-forming layer is formed into a rib prior to or during the application of the composite strip to the insole, it will readily conform to the contour of the insole and hence a square-cut tape, which is cheaper than the bias-cut, may be used for this layer.

The square-cut rib-forming layer is preferably formed by cutting the material lengthwise of the warp so that the filler or woof threads, which are usually stronger than the warp threads, will extend transversely of the strip and will extend in the direction of the lasting strain when the upper is secured in lasted position to the rib formed from the rib-forming layer. The strong filler threads will also be embraced by the inseam stitches when the shoe is welted.

Furthermore, if a firmer rib is desired, the rib-forming layer, either before or after it is attached to the base layer, may be treated with a solution of stiffening material, for example thermoplastic stiffening material such as a solution of a gum such as dammar, copal, cumaron or "Nuba." For this purpose the Nuba gum is preferred, not only for the sake of economy, but because it has been found suitable for the purpose. This material may be obtained from the Neville Company, of Pittsburgh, Pennsylvania, in various grades, the grade preferred for this purpose having a melting point between 120° and 125° C. Nuba, which is a product of the distillation of coal tar (and hence belongs to the aromatic series), is thermo-softening, tough, elastic and readily soluble in benzol or naphtha, the following formula having been found satisfactory:

Nuba _____ per cent__ 70
Benzol _____ do____ 15
Naphtha _____ do____ 15

The penetration of the fabric by the Nuba solution may be controlled by adding a small amount of rubber, as little as one half of one per cent having been found to reduce substantially the penetration of the solution.

Cumar gum or cumaron resin is also effective for the purpose, one and a half parts of the gum being dissolved in one part of toluol. Other materials which will impart a substantial stiffening effect to the strip without rendering it too stiff may be used such as protein derived from the soy-bean, or casein may be used provided a plasticizing agent such as urea or triethanolamine is used. The following formula has been found satisfactory:

Soy-bean protein_____ grams__ 100
Ammonia _____ cc____ 10
Urea_____ grams__ 30
Water_____ cc____ 860

Cellulose derivatives may also be employed as a stiffening agent; for example, 20 parts of cellulose acetate or cellulose nitrate may be dissolved in 80 parts of methyl acetone and a suitable plasticizer for the cellulose derivative such as dibutyl phthalate added in a small proportion. Any of the above suggested materials will serve as stiffening material for the rib-forming layer and hence for the rib of the insole.

Preferably one of the above stiffening solutions, for example the Nuba solution, is first applied to a web of fabric such as Gem duck and, after drying, the same side of the fabric is coated with latex as indicated at 16 and dried. The web is then cut lengthwise of the warp into strips of suitable width, each strip being made into a roll of suitable size. Another roll of bias-cut fabric is prepared to constitute the base layer and is coated on one side with pressure-responsive cement such as latex, as indicated at 18. The two strips are then laid one upon the other with their uncemented surfaces in contact and suitably fastened together, for example by two parallel rows of stitching 14 sewed along the central portions of the strip to fasten them together. The composite strip, after sewing, may be made into a roll, a strip of paper being introduced between the layers to prevent their cement-coated surfaces 16, 18 adhering to each other.

The insole body may, as illustrated in Fig. 5, be a single layer 20 of cheap leather rounded or died to the proper insole shape and provided about its periphery with a band of pressure-responsive cement, for example latex.

In some instances it may be desirable to employ for the insole a cheap grain split or a flesh split, such as is removed from the flesh side of skins that are to be made into patent leather, or synthetic material, e. g. "Onco." In this case, as shown in Fig. 2, a layer 22 of such leather is provided with a layer 24 of buckram, canvas or other relatively cheap textile material. This textile material, if it is not already stiff enough to impart sufficient body to the insole, may be treated with one of the stiffening materials mentioned above, for exapmle the Nuba solution, and dried before it is applied to the insole and may then be cemented to the layer 22 by suitable cement such as latex. A band of pressure-responsive cement will then be applied to the textile-covered face of the insole body to prepare it for the reception of the composite strip.

The composite strip may now be applied to either of the prepared insoles, the cemented face 18 of the base layer 10 being pressed firmly against the band of pressure-responsive cement upon the insole and the marginal portions of the layer 12, unless previously formed into a rib, are turned up against each other to form a rib, as illustrated in Figs. 1 and 2. The marginal portions of the layer 12, when pressed together, adhere to each other to form a substantial rib which may be either upright or inclined inwardly of the insole as illustrated. Because of the slight spacing of the lines of stitches 14, the rib formed is more or less triangular in cross-section and the marginal portions of the rib-forming layer taper toward each other outwardly of the base layer and are spaced from each other adjacent to the base layer. The rib therefore presents substantial resistance to being bent outwardly of the insole, especially when the layer 12 has been treated with a stiffening solution as above indicated. In applying to the insole a composite strip the layer 12 of which has been stiffened with a thermoplastic stiffening solution, it may be desirable, in order that the marginal portions of the strip 12 may be readily bent up into engagement with each other, to heat the strip just prior to this operation, thus rendering the layer 12 limp and easier to manipulate.

Under some conditions it is desirable, in order to form a firmer rib, to introduce between the marginal portions of the layer 12 a core 26, illustrated as a cord in Figs. 4, 5 and 6, in conjunction with the folding of the marginal portions of the layer 12 against each other. In this case the marginal portions of the layer 12 are wrapped around the core 26 and their outer edges, which preferably extend beyond the core, are pressed together and caused to adhere to each other, thus completely enclosing the core. In case a core is used it is preferable to increase the space between the lines of stitches 14 and thus provide a wider base for the rib where it engages the insole. Of course, cores of any desired cross-section may be introduced and enclosed by folding the marginal portions of the layer 12 about them. One desirable form of cored rib is shown in Fig. 6.

In order to provide a reinforced sewing rib without the use of a core, the composite strip may, as illustrated in Fig. 7, comprise three layers instead of two, a third layer 30 being added to the base layer 10 and the rib-forming layer 12. The reinforcing strip or layer 30 may be considerably narrower than the rib-forming layer 12 and may, for example, be about one half or one third as wide as the rib-forming layer. The strip 30 may be formed of the same square-cut material as the layer 12 and is preferably coated on the surface which is to engage the layer 12 with latex cement, as indicated at 31 in Fig. 7, the cemented surface being pressed against the cemented surface of the layer 10 after the seams 14 have been sewed. Obviously also the strip 30 may if desired be included in the stitching 14. The three-layer composite strip is now ready to be applied to the insole body 20 of Fig. 5 or to the reinforced insole body 22, 24 of Fig. 2, and in conjunction with its application or subsequently thereto the marginal portions of the rib-forming layer 12 are turned toward each other and pressed together, thus causing the reinforcing layer 30 to be folded upon itself and enclosed by the rib-forming layer 12 the cemented margins of which if they extend beyond the reinforcing strip 30 are pressed against each other to cause them to adhere and hold the layers in rib-forming position, as shown in Fig. 8.

The three-layer composite strip of Fig. 7 may be prepared and rolled upon itself without the introduction of a strip of paper to prevent the cemented surfaces from adhering to each other since the uncoated outer surface of the narrow layer 30 when the strip is rolled engages the cemented face 18 of the base layer 10 and prevents the cement-coated face 18 of the layer 10 from engaging the cement-coated surface 16 of the layer 12, it being understood, of course, that a coating of latex cement will not adhere objectionably to an uncoated fabric surface. Moreover, the strip shown in Fig. 7 may be formed for application to an insole, prior to such application, as shown in Fig. 8, except that the layer 10 would be unattached to an insole. The strip so formed may be wound upon a reel, the upstanding rib 12, 30 being folded down against one of the margins of the strip 10. The rib may be restored to upright position by a suitable strip guide applied to the machine by which the layer 10 is pressed against cement on the insole to cause attachment of the rib to the insole.

Having thus described my invention, what I claim as new and desire to secure by Letters Patent of the United States is:

1. A strip for forming ribs on insoles comprising a rib-forming layer and a base layer both of textile material of indefinite length, the lower surface of the base layer being coated with cement whereby said layer is adapted to be secured throughout the extent of its cemented surface to an insole body, the upper surface of said rib-forming layer being coated with cement whereby the marginal portions of said rib-forming layer are adapted to be adhered together to form a sewing rib, said rib-forming and base layers being directly connected together longitudinally and continuously of the strip intermediate the margins of the layers over a wide transverse portion so that when the marginal portions of the rib-forming layer are adhered together they will taper toward each other outwardly of said base layer and will be spaced from each other adjacent to the base layer.

2. A strip for application to insoles to form ribs thereon comprising two layers of cotton fabric connected together in face-to-face contact by stitches along their central portions and coated on both exposed faces with pressure-responsive cement, one only of said layers being impregnated with thermoplastic stiffening material in addition to the cement.

3. A strip for making insole ribs comprising two cotton fabric tapes of substantially equal width placed in face-to-face contact and sewed together along their central portions by two rows of stitches spaced from each other, one tape only being stiffened with thermoplastic stiffening material.

4. A strip for forming ribs on insoles comprising a rib-forming layer and a base layer both of textile material of indefinite length, the lower surface of the base layer being coated with cement whereby said layer is adapted to be secured throughout the extent of its cemented surface to an insole body, the upper surface of said rib-forming layer being coated with cement whereby the marginal portions of said rib-forming layer are adapted to be adhered together to form a sewing rib, said rib-forming and base layers being directly connected together longitudinally and continuously of the strip intermediate the margins of the layers by parallel lines of continuous stitching sufficiently widely spaced transversely so that when the marginal portions of the rib-forming layer are adhered together they will taper toward each other outwardly of said base layer.

5. A strip for forming ribs on insoles comprising two layers of textile material of indefinite length and approximately the same width laid upon each other and connected together face to face along their central portions, the outer face of each layer being coated with pressure-responsive cement and one layer containing thermoplastic stiffening material whereby the unstiffened layer is adapted to be secured flatwise to an insole and the marginal portions of the stiffened layer are adapted to be turned against each other to form a stiffened sewing rib.

6. A strip for application to insoles to form ribs thereon comprising two layers of material connected together along their central portions, one layer being provided with cement adapted to be stuck to an insole, a core engaging the other layer, said other layer being wrapped around the sides of the core with its meeting edges secured together beyond the core.

7. A strip for forming ribs on insoles comprising a base layer and a rib-forming layer both of textile material of indefinite length, and a reinforcing layer of indefinite length on said rib-forming layer, the lower surface of the base layer being coated with cement whereby said layer is adapted to be secured throughout the extent of its cemented surface to an insole body, the upper surface of said rib-forming layer being coated with cement, the marginal portions of said rib-forming layer and reinforcing layer being pressed together to form a sewing rib enclosing said reinforcing layer, said rib-forming and base layers being directly connected together longitudinally and continuously of the strip intermediate the margins of the layers over a transverse portion sufficiently wide so that the marginal portions of the rib-forming layer will taper toward each other outwardly of said base layer.

8. A strip for forming sewing ribs on insoles comprising a base layer, and a plurality of strips attached to the central portion of the base layer, said strips being adapted to have their marginal portions raised and secured together to form a sewing rib.

9. A composite strip for attachment to an insole to form a sewing rib thereon comprising a base layer cemented on its lower surface, and a rib-forming layer cemented on its upper surface, said layers being secured directly together with their uncemented surfaces in juxtaposition by two rows of continuous, longitudinally extending lines of stitches disposed between the margins of said layers and spaced from each other a distance approximately equal to the width of the base of an insole rib.

10. An insole comprising an insole-shaped body, a strip secured to said body by cement alone along its peripheral margin, and a sewing rib held by stitches to said cemented strip, the rib comprising two layers one narrower than the other folded upon themselves, the margins of the outer layer being secured together to enclose the narrower inner layer.

11. A strip for making insole ribs comprising two fabric layers secured together along their central portions, said layers having pressure-responsive cement on both exposed faces, and a third narrower layer of fabric applied to the cemented face of one of said layers.

12. A strip for making insoles comprising two fabric layers secured together along their central portions by two rows of stitches spaced slightly from each other, said layers having pressure-responsive cement on both exposed faces, and a narrower layer of fabric cemented to one of said layers and covering the stitches.

13. A strip for forming ribs on insoles comprising two layers of textile material of indefinite length and approximately the same width connected together along their central portions, the outer face of each layer being coated with pressure-responsive cement, and a narrow strip of textile material applied to one layer whereby one layer of the composite strip is adapted to be secured flatwise to an insole and the marginal portions of the other layer are adapted to be turned upwardly to enclose said narrow strip, said portions being adapted to be brought against each other beyond the narrow strip to form a sewing rib.

14. A strip for applicaton to insoles to form ribs thereon comprising two layers of fabric connected directly together by a plurality of transversely spaced lines of stitches extending continuously and longitudinally along the strip between the marginal portions thereof, said layers of fabric being coated on both their outer faces with cement, one only of said layers being stiffened.

15. A strip for forming ribs on insoles comprising a rib-forming layer and a base layer both of textile material of indefinite length, the lower surface of the base layer being coated with cement whereby said layer is adapted to be secured throughout the extent of its cemented surface to an insole body, said rib-forming layer having stiffening material incorporated therein and having its upper surface coated with cement, the marginal portions of said rib-forming layer being adhered together to form a sewing rib, said rib-forming and base layers being directly connected together longitudinally and continuously of the strip intermediate the margins of the layers over a wide transverse portion so that the marginal portions of the rib-forming layer taper toward each other outwardly of said base layer and are spaced from each other adjacent to the base layer.

16. A composite strip for attachment to insoles to form sewing ribs thereon comprising a base layer cemented on its lower exposed surface, and a rib-forming strip secured to the uncemented side of the base layer to a transverse extent approximately equal to the width of the base of an insole rib, said rib-forming layer having cement on its exposed surface, and a third layer of material adhesively secured to a cemented surface of said rib-forming layer.

17. A composite strip for attachment to an insole to form a sewing rib thereon comprising a base layer cemented on its lower surface, and a rib-forming layer cemented on its upper surface, said layers being secured directly together with their uncemented surfaces in juxtaposition by a plurality of transversely spaced lines of stitches extending continuously and longitudinally along the strip between the marginal portions thereof, and a layer of material cemented to the upper surface of the rib-forming strip and covering the stitching.

18. An insole comprising a body layer of insole shape, a strip cemented to the marginal portion of the body layer, said strip comprising two tapes secured together along their central portions, a core disposed centrally of the outer tape, said tape having marginal portions extending about the sides of the core and meeting beyond the core.

19. A composite strip for attachment to insoles to form sewing ribs thereon comprising a base layer cemented on its lower exposed surface, and a rib-forming layer secured to the uncemented side of the base layer by two rows of continuous, longitudinally extending lines of stitches disposed between the margins of said layers and spaced from each other a distance approximately equal to the width of the base of an insole rib, said rib-forming strip being cemented on its upper surface, and a layer of material cemented to the upper surface of the rib-forming strip and covering the stitches.

10. A strip for application to insoles to form ribs thereon comprising two layers of fabric connected together intermediate their margins, one layer being provided with cement adapted to adhere to an insole, a core engaging the other layer, said other layer being wrapped around the sides of the core with its meeting edges secured together beyond the core.

21. An insole for use in making welted shoes comprising an insole body, a base layer strip secured by cement alone to the marginal portion of the insole body, and a plurality of strips attached by stitching to the central portion of said base layer strip, the marginal portions of said plurality of layers not secured to the base layer being turned upwardly and secured together to form a sewing rib.

22. An insole comprising a body layer of insole shape, a flat strip cemented throughout the extent of one of its faces in face-to-face relation to the marginal portion of the body layer, and a second strip having a portion thereof as wide laterally as the between-substance of an insole secured in engagement with the exposed face of the first strip at a location between its edges, the free marginal portions of the second strip being secured together to form a sewing rib having a substantial base.

23. An insole for use in making welted shoes comprising an insole body, a base layer strip secured by cement alone to the marginal portion of the insole body, and a plurality of strips attached to the central portion of said base layer strip, the portions of said plurality of strips not attached to the base layer being adapted to be turned upwardly and cemented together to form a sewing rib.

24. An insole comprising a body layer of insole shape, a flat strip cemented throughout the extent of one of its faces in face-to-face relation to the marginal portion of the body layer, and a second strip having an area between its edges secured in engagement with the exposed face of the first strip at a location between its edges by a plurality of continuous, parallel lines of stitching, the free marginal portions of the second strip being cemented to each other.

25. An insole comprising a body layer of insole shape, a flat strip cemented throughout the extent of one of its faces in face-to-face relation to the marginal portion of the body layer, and a second strip having a longitudinally extending area between its edges secured in engagement with the exposed face of the first strip at a location between its edges by a plurality of continuous lines of stitching spaced sufficiently to form an attached area between the strips corresponding in width to the width of the between-substance of a conventional welt insole, the free marginal portions of the second strip being cemented to each other.

26. An insole comprising a body layer of insole shape, a flat strip cemented throughout the extent of one of its faces in face-to-face relation to the marginal portion of the body layer, and a second strip having an area of substantial width located between its edges and extending longitudinally of the strip secured in engagement with the exposed face of the first strip at a location between the edges thereof, the free marginal portions of the second strip being secured together, said second strip being stiffened.

27. An insole for use in making welted shoes comprising a body layer of insole shape, a textile layer cemented to the body layer, a flat strip cemented throughout the extent of one of its faces in face-to-face relation to the marginal portion of the textile layer, and a second strip having an area between its edges sewed to the exposed face of the first strip at a location between its edges, the stitches passing only through the two strips, the free marginal portions of the second strip being cemented together.

28. That improvement in methods of forming composite strips for attachment to insoles to form sewing ribs thereon which comprises providing a strip cemented on one side to form a base layer, attaching a second strip to the uncemented side of the base layer by stitches passing through the base layer between its edges, attaching a third strip to the second strip, and turning up margins of the second and third strips to form a sewing rib.

29. That improvement in methods of forming composite strips for attachment to insoles to form sewing ribs thereon which comprises providing a strip cemented on one side to form a base layer, attaching along the central portion of the uncemented side of the base layer a plurality of strips one narrower than the other, and turning up the margins of the wider strip to enclose the narrower strip.

30. That improvement in methods of forming composite strips for attachment to insoles to form sewing ribs therein which comprises providing a strip cemented on one side to form a base layer, attaching a plurality of strips to the uncemented side of the base layer by stitches passing through the central portion of the base layer, and turning up margins of the plurality of strips to form a sewing rib.

31. That improve in methods of forming composite strips for attachment to insoles to form sewing ribs thereon which comprises providing a cemented strip to form a base layer, attaching a plurality of strips to the central portion of the base layer, and upturning marginal portions of the attached strips to form a sewing rib.

32. A method of making insoles which comprises providing a composite strip of two separate layers placed flatwise one upon the other and sewed together along their central portions, said strip being coated with pressure-responsive cement on its exposed faces, and one layer being impregnated with the thermoplastic stiffening material, applying pressure-responsive cement to the marginal portions of an insole body, heating the strip, pressing the cemented face of the unstiffened layer upon the cemented area of the insole body, and raising and pressing together the marginal portions of the stiffened outer layer of the strip while they are in a heated condition.

33. The method of making insoles which comprises providing a composite strip of two separate, superimposed layers sewed together along their central portions, said strip being coated with pressure-responsive cement on its exposed faces, applying pressure-responsive cement to the marginal portions of the insole body, pressing one cemented face of the strip upon the cemented area of the insole body, laying a core upon the outer layer and raising the marginal portions of the outer layer of the strip to enclose the core, and pressing together marginal portions of said layer which extend beyond the core to enclose the core.

34. A method of making insoles which comprises providing a composite strip of two separate superimposed layers sewed together along their central portions, said strip being coated with pressure-responsive cement on its exposed faces, applying pressure-responsive cement to the marginal portions of an insole body, pressing one cemented face of the strip upon the cemented area of the insole body, and raising and pressing together the marginal portions of the outer layer of the strip.

35. That improvement in methods of making insoles which comprises providing a composite strip composed of a base layer and a plurality of strips secured to the central portion of the base layer, said base layer being provided with pressure-responsive cement on the face opposite said plurality of strips, applying pressure-responsive cement to the marginal portion of an insole body, pressing the cemented face of the base layer upon the cemented area of the insole body, and raising and pressing together the portions of the plurality of strips not secured to the base layer.

STANLEY M. GRISWOLD.